United States Patent [19]

DeGray

[11] 4,220,241

[45] Sep. 2, 1980

[54] AUTOMATIC BREAD FEEDER

[76] Inventor: William G. DeGray, P.O. Box 36, Port Isabel, Tex. 78578

[21] Appl. No.: 958,785

[22] Filed: Nov. 8, 1978

[51] Int. Cl.² .............................................. B65G 15/00
[52] U.S. Cl. .................................... 198/408; 198/456; 198/774; 414/330
[58] Field of Search ................................ 198/406–409, 198/458, 426, 461, 456, 476, 576, 607, 610, 774–776; 414/330; 271/149, 150; 99/443 C

[56] References Cited

U.S. PATENT DOCUMENTS

| 1,889,846 | 12/1932 | Wright | 198/426 X |
|---|---|---|---|
| 3,743,114 | 7/1973 | Van Linder et al. | 414/330 |
| 4,034,119 | 7/1977 | Karbe | 99/443 C |
| 4,151,907 | 5/1979 | Doty | 198/774 |

Primary Examiner—Robert B. Reeves
Assistant Examiner—Douglas D. Watts

Attorney, Agent, or Firm—Clarence A. O'Brien; Harvey B. Jacobson

[57] ABSTRACT

An items handler for successively handling a horizontal row of items in an intermittent or indexing, controlled dimension motion. The handler includes structure defining a movement direction change station and receiving structure for receiving a horizontal row of items thereon and lengthwise advancing the row of items along a predetermined path toward the aforementioned station. Structure for successively engaging items advanced toward the station is provided and for laterally shifting the endmost item in the row of items advanced toward the station. Second receiving structure is provided for successively receiving and stationarily supporting items laterally shifted by the items engaging and shifting structure and discharge structure is provided for successively discharging items received by the second receiving structure. The discharge structure includes features thereof operative to downwardly discharge, by gravity, items from said second receiver structure.

13 Claims, 9 Drawing Figures

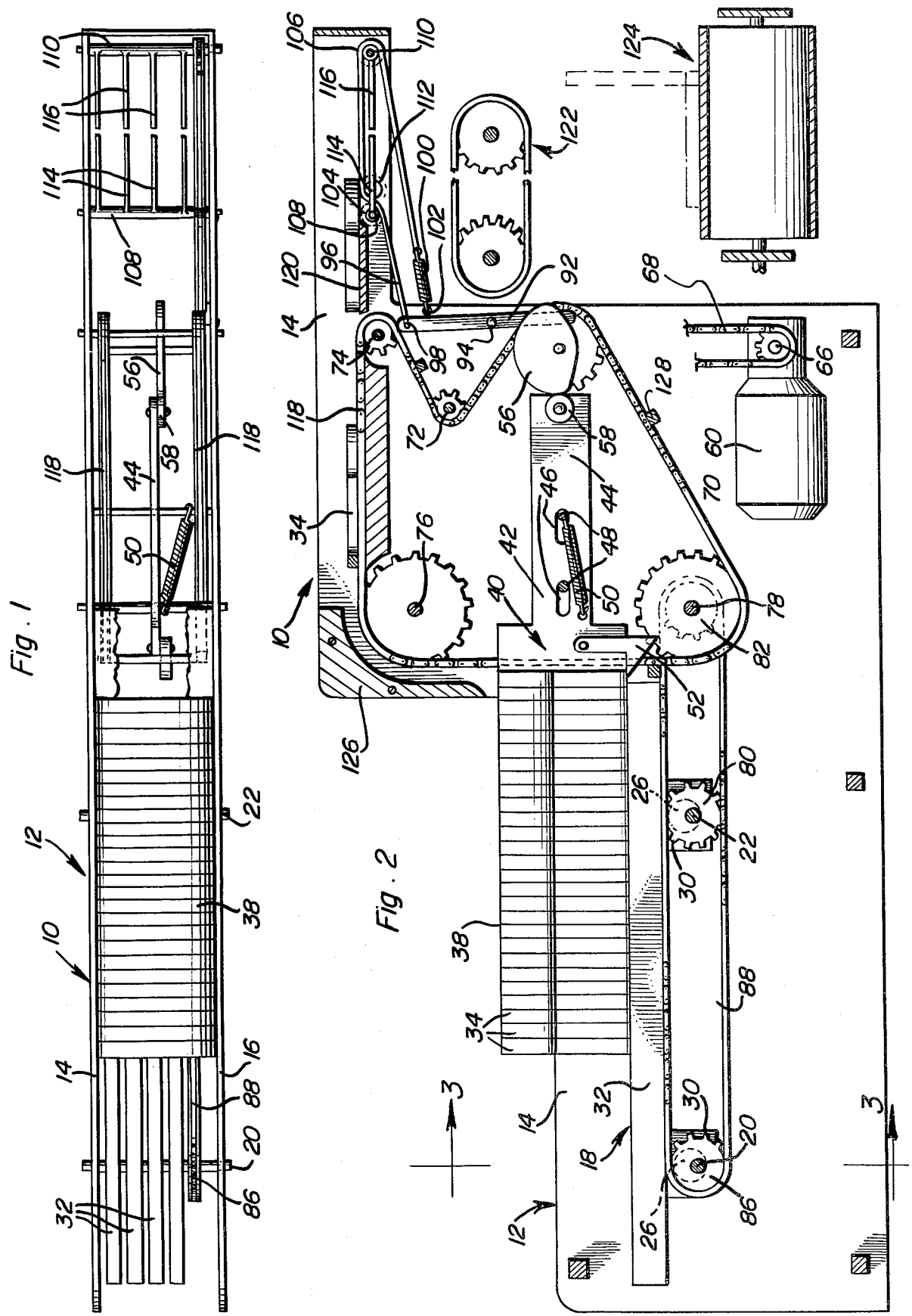

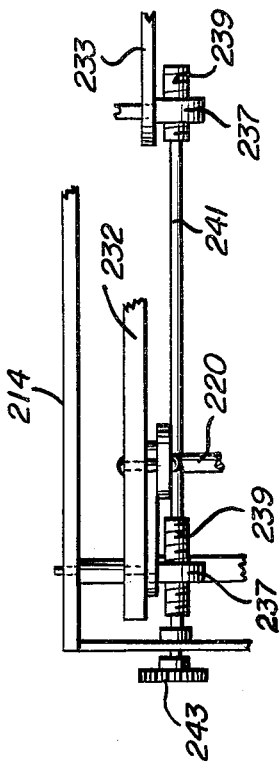
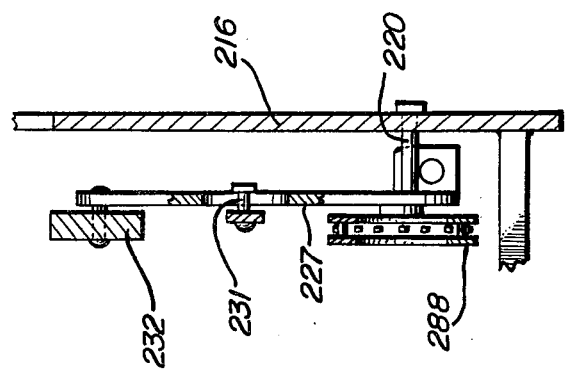
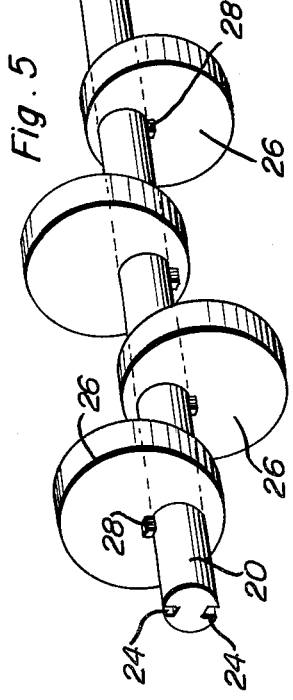
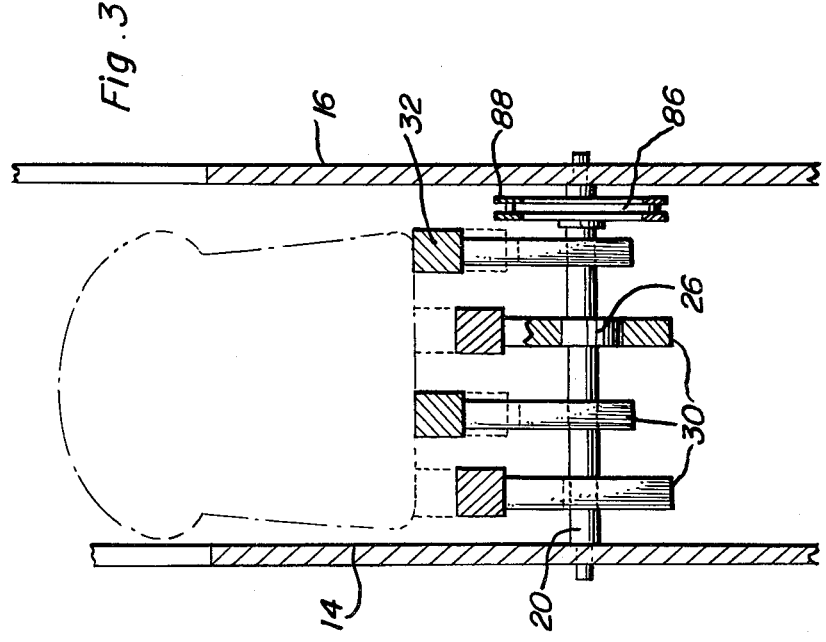

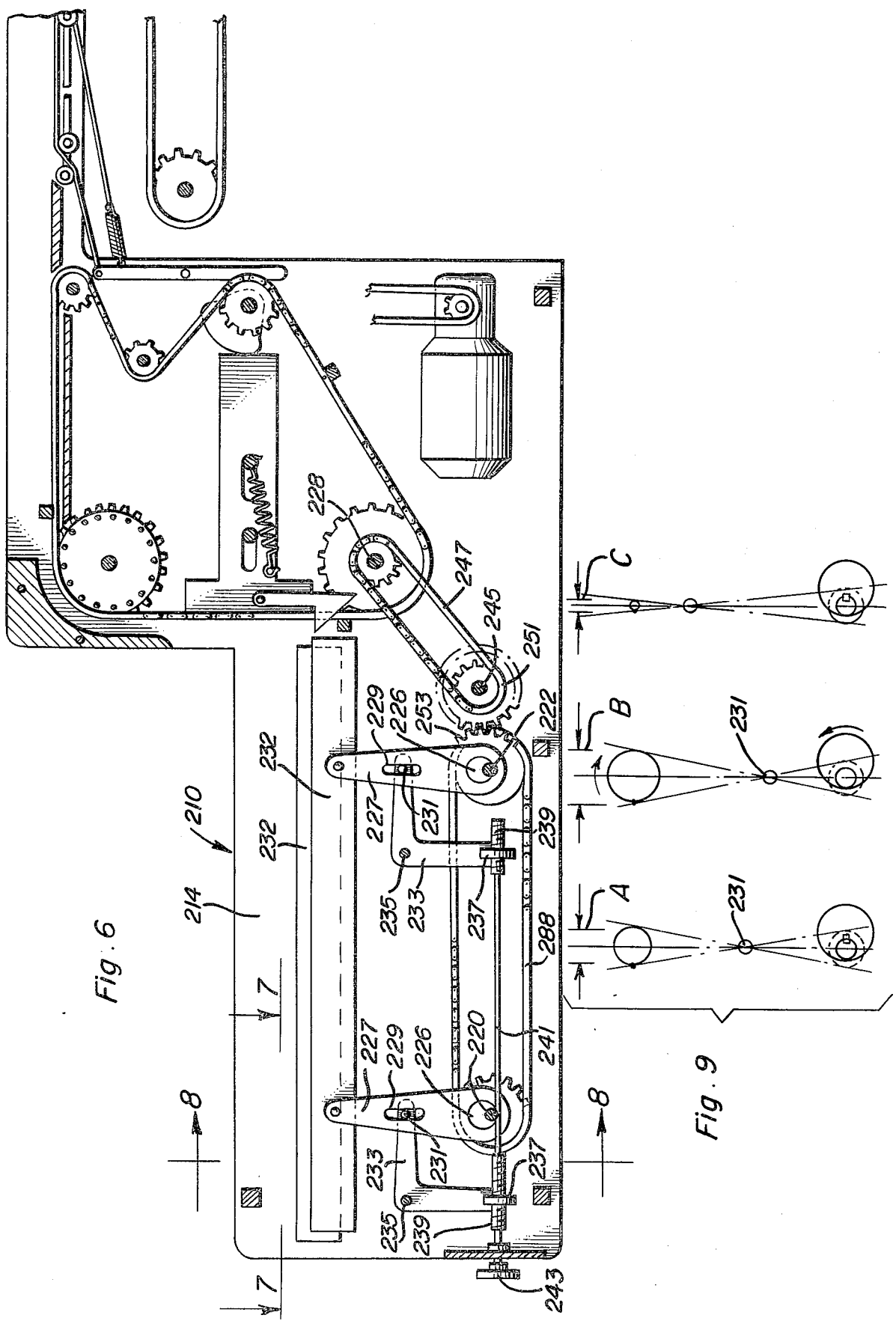

AUTOMATIC BREAD FEEDER

BACKGROUND OF THE INVENTION

Various forms of structures have been heretofore designed for successively handling items advanced theretoward in a row in a controlled indexing motion. However, these previously known structures are not specifically designed for use in conjunction with horizontal rows of unpackaged food materials and it is deemed readily apparent that unpackaged food materials must be handled in a different manner than packaged materials. Accordingly, in view of the trend toward increased pre-cooking and/or preparation of food materials, a need exists for an items handler which will be adapted to handle various sizes of food items.

Examples of previously known forms of items handling devices including some of the general structural and operational features of the instant invention are disclosed in U.S. Pat. Nos. 2,731,905, 2,861,670, 2,959,269 and 3,643,780. However, these previously known forms of item handling structures are not conducive to the handling of unpackaged food items such as bread loaf slices.

BRIEF DESCRIPTION OF THE INVENTION

The items handler of the instant invention has been specifically designed for automatic handling of loaves of sliced bread. The bread is handled by the handler in a manner such that a horizontal row of slices of bread loaf may be longitudinally advanced in an indexing motion toward an items engaging station and individual slices of bread may be successively engaged and laterally shifted from the engaging station toward a receiving station in which the slices of bread are intermittently stationarily supported. The receiver station further includes structure whereby individual slices of bread received thereby may be intermittently discharged, by gravity, from the receiving station.

The main object of this invention is to provide an items handler for facilitating the bulk handling of unpackaged food materials.

Another object of this invention is to provide an items handler specifically adapted for handling and advancing elongated loaves of individual slices of bread with motion adjustable to the individual slice thickness and, subsequently, laterally shifting individual slices of bread from the end of the loaf being advanced and conveying the individual bread slices to a receiving station from which the bread slices may be successively discharged, if desired.

Yet another important object of this invention is to provide an items handler constructed in a manner whereby it may be readily adjusted for handling rows of items of different thicknesses by changing the dimension of the indexing cycle.

A further object of this invention is to provide an items handler which will be capable of handling packaged materials as well as unpackaged food materials in an indexing fashion.

A final object of this invention to be specifically enumerated herein is to provide an items handler in accordance with the preceding objects and which will conform to conventional forms of manufacture, be of simple construction and easy to use so as to provide a device that will be economically feasable, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the items handler of the instant invention with parts of the handler being broken away;

FIG. 2 is a longitudinal vertical sectional view taken substantially upon a plane passing through the items handler of FIG. 1;

FIG. 3 is an enlarged transverse vertical sectional view taken substantially upon the plane indicated by the section line 3—3 of FIG. 2;

FIG. 5 is a perspective view of one of the indexing conveyor cam assembly of the items handler;

FIG. 6 is a longitudinal vertical sectional view similar to FIG. 2 but illustrating a modified form of items handler utilizing an adjustable length feed increment intermittent feed conveyor;

FIG. 7 is an enlarged fragmentary horizontal sectional view taken substantially upon the plane indicated by the section line 7—7 of FIG. 6;

FIG. 8 is an enlarged fragmentary transverse vertical sectional view taken substantially upon the plane indicated by section line 8—8 of FIG. 6; and FIG. 9 is a schematic view illustrating the manner in which the adjustable length feed increment items conveyor illustrated in FIG. 6 may be adjusted in order to effect feed increments of three different lengths.

DETAILED DESCRIPTION OF THE INVENTION

Figure 4:
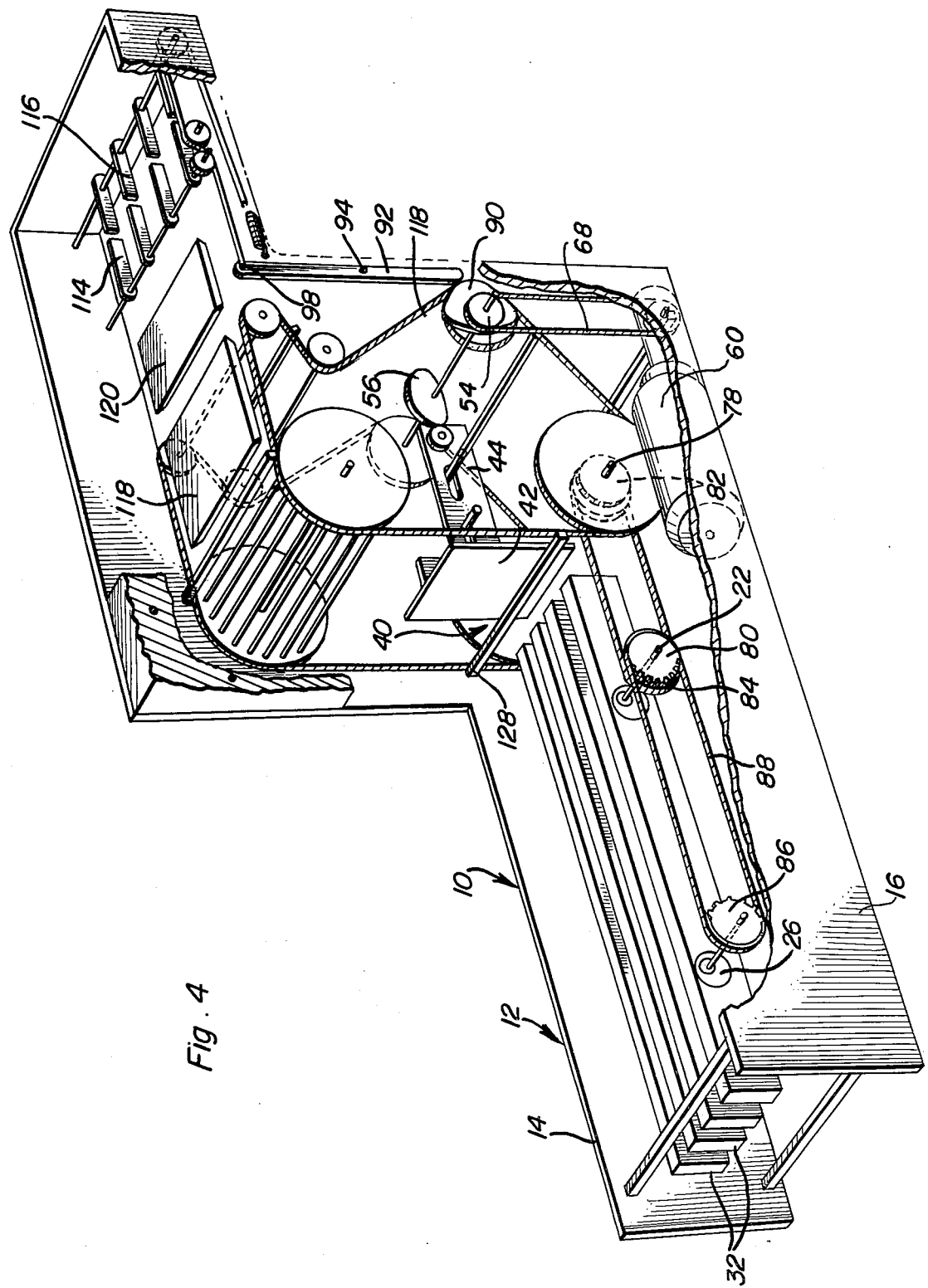
FIG. 4 is a perspective view of the items handler with portions of the near side frame being broken away.

Referring now more specifically to the drawings the numeral 10 generally designates the automatic bread feeder or items handler of the instant invention. The items handler 10 includes a frame 12 having opposite side portions 14 and 16 between which an items receiving and conveyor assembly referred to in general by the reference numeral 18 is disposed.

The assembly 18 includes a pair of transverse shafts 20 and 22 extending between and journalled from the side portions 14 and 16 and the shafts 20 and 22 include diametrically opposite longitudinal keyways 24, see FIG. 5, by which eccentric discs 26 are keyed to each shaft 20 and 22 by means of keys 28. The dics 26 are journalled in journal blocks 30 dependingly supported from shiftable rails 32 of the conveyor assembly 18. The conveyor assembly 18 includes two pairs of rails 32 with each pair of rails 32 having a rail 32 of the other pair spaced therebetween. Further, the discs 26 supporting one pair of rails 32 are displaced 180° relative to the shafts 20 from the discs 26 supporting the other pair of rails 32. Therefore, it may be seen that upon rotation of the shafts 20 and 22 the pairs of rails 32 will be alternately raised and lowered and inasmuch as the shafts 20 and 22 are rotated in clockwise directions as viewed in FIG. 2 of the drawings, the items 34 comprising slices of a loaf 38 of bread are advanced along the conveyor assembly 18 to the right as viewed in FIG. 2 in an intermittent incremental or indexing motion.

It is, however, pointed out that the discs supporting one pair of rails 32 could be mounted on the shafts 20 and 22 concentric therewith. In this manner, only one pair of rails 32 would be utilized to intermittently advance the slices comprising the loaf 38 at one-half the rate of speed.

The conveyor assembly 18 comprises structure for supporting and longitudinally advancing horizontal rows of items such as the slices 34 of the loaf 38. At the discharge or right end of the conveyor assembly 18 shown in FIG. 2 is defined a receiver station referred to in general by the reference numeral 40 and the receiver station 40 includes structure 42 for terminating longitudinal advancement of the endmost slice 34 and for engaging the endmost slice 34 and laterally upwardly shifting the engaged slice 34 from the indexing conveyor assembly 18.

The structure 42 comprises a slide assembly 44 slotted as at 46 and sliding supported from a pair of transverse pins 48 extending and secured between the side portions 14 and 16 and an expansion spring 50 is operatively connected between the structure 42 and one of the pins 48 for yieldingly biasing the structure 42 to its rearmost limit position. Opposite side portions of the left end of the structure 42 in FIG. 2 includes a pair of depending swingably supported cam hooks 52 and the rear portion of the frame 12 includes a transverse shaft 54 upon which a cam 56 is mounted, the cam 56 being engaged with a roller 58 journalled from the structure 42.

An electric motor 60 including a power output shaft 66 is drivingly coupled to the shaft 54 by means of an endless drive chain 68 and a pair of drive chains 70 are trained about additional transverse shafts 72, 74, 76 and 78 having sprocket wheels mounted thereon over which the chains 70 pass, the shafts 54 and 56 also including sprocket wheels over which the chain 68 pass. The shaft 22 includes a sprocket wheel 80 aligned with a similar sprocket wheel 82 on the shaft 78 and over which an endless chain 84 is trained and the shaft 22 includes a second sprocket wheel 84 aligned with a sprocket wheel 86 carried by the shaft 20 about which an endless chain 88 is trained. Accordingly, the motor 68 is operative to drive all of the shafts 20, 22, 54, 66, 72, 74, 76 and 78.

The shaft 54 additionally includes a second cam 90 thereon and the lower end of an upstanding elongated lever 92 is engageable by the cam 90, the lever 92 being pivotally supported from the side portion 14 of the frame 12 as at 94 and including an upper end to which one end of a link chain 96 is attached as at 98. The other end of the link chain 96 is attached, by means of an expansion spring 100, to the side portion 14 of the frame 12 as at 102.

A link chain 96 is trained about sprocket wheels 104 and 106 mounted on shafts 108 and 110 extending an journalled between the side portions 14 and 16 and an idler sprocket wheel 112 is supported from the side portion 12 and deflects the chain 96 between the sprockets wheels 104 and 106, the chain passing beneath the sproket wheel 104 and over the sprocket wheel 106.

The shafts 108 and 110 carry radial support panels or combs 114 and 116 defining trap doors and the chains 70 include reaches 118 thereof extending between the shafts 74 and 76 for supporting individual slices 34 and horizontally displacing the slices 34 supported thereby toward a stationary table portion 120 upon which the slices 34 are slid into supported position. The slices supported on the table portion 120 are subsequently pushed by the next slices discharged on to the table portion 120 on to panels or trap doors 114 and 116. A horizontal conveyor assembly referred to in general by the reference numeral 122 is disposed beneath the trap doors 114 and 116 and extends horizontally away from the frame 12 and includes a discharge end spaced horizontally above a further conveyor assembly referred to in general by the reference numeral 124.

The upper central portion of the frame 12 includes an items or slice deflector 126 and the deflector 126 is operative to deflect items upwardly displaced by the lift bars 128 supported from and extending between the chains 70 in the direction in which the reaches 118 extend. Accordingly, as the loaf 38 is intermittently advanced along the conveyor assembly 18 toward the structure 42, the slice 34 of the loaf 38 forwardmost in the direction of movement of the loaf 38 engages the structure 42 in the manner illustrated in FIG. 2 of the drawings. As each increment of advancement of the loaf 38 by the conveyor assembly 18 is terminated the cam 56 displaces the structure 42 to its left most position as illustrated in FIG. 2 of the drawings and terminates advancement of the loaf 38. Then, the cam 56 rotates the toe portion thereof out of engagement with the roller 58 whereby the spring 50 shifts the structure 42 to the right as viewed in FIG. 2 thus freeing the opposing slice 34 and relieving the back pressure in the loaf 38. At this time, one of the transverse slice engaging and lift bars 128 extending between and supported from the chains 70 engages and rearwardly deflects the lowermost portions of the hooks 52 in order that the latter may be retracted to the right as viewed in FIG. 2 of the drawings and subsequently engages and upwardly displaces the slice into engagement with the deflector 126 and onto the reaches 118 of the chains 70 for discharge therefrom onto the table 120 and across the latter onto the panels 114. Thereafter, the cam 90 engages the lower end of the lever 92 in order that a pull on the chain 96 is effected by the upper end of the lever to swing the trap doors 114 and 116 in clockwise and counterclockwise directions, respectively, so as to discharge, by gravity, the slice 34 supported on the trap doors 114 downwardly for engagement and support from the conveyor assembly 122. Thereafter, the conveyor assembly 122 horizontally conveys the slice to the discharge end of the conveyor 122 to whereupon the slice falls from the discharge end of the conveyor 122 onto the conveyor 124. Of course, the conveyor 124 may convey the slice to any desired remote location.

With attention now invited more specifically to FIGS. 6 through 9 of the drawings, there may be seen a modified form of items handler referred to in general by the reference numeral 210 and which is substantially identical to the items handler 10, except that the eccentric discs 226 thereof corresponding to the eccentric discs 26 are jounalled in and support the lower ends of upstanding arms 227 from whose upper ends rails 232 corresponding to the rails 32 are supported. The arms 227 are vertically slotted as at 229 and slidingly receive pins 231 therethrough supported from bell cranks 233 oscillatably supported from transverse shafts 235 extending between and supported from the side portions 214 and 216 of the items handler 210.

The bell cranks 233 include threaded fixtures 237 pivotally supported from the lower ends thereof and threaded portions 239 of an operating shaft 241 are threaded through the fixtures 237, each operating shaft 241 including an operating knob 243 projecting outwardly from the left end of the items handler 210 as illustrated in FIG. 6. Accordingly, the shaft 241 may be turned to angularly displace the bell cranks 233 and angular displacement of the bell cranks 233 will raise and lower the pins 231 snugly slidingly received in the slots 229. Accordingly, when the bell cranks 233 are adjusted as illustrated in FIG. 6 of the drawings, the horizontal axes of oscillation of the arms 227 defined by the pins 231 will be adjusted approximately half-way above and below their upper limits whereby for a given horizontal oscillation of the lower ends of the arms 227 the upper ends of the arms 227 will oscillate horizontally a medium distance such as that indicated as at "A" in FIG. 9. On the other hand, upon rotation of the shafts 241 to effect angular displacement of the bell cranks 233 to lower the pins 231, the upper ends of the arms 237 will experience maximum horizontal or orbital oscillation such as that indicated as at "B" in FIG. 9. Finally, if the shafts 241 are rotated to adjust the bell cranks 233 to positions with the pins 231 in their uppermost positions, the upper ends of the arms 227 will experience minimum horizontal or orbital oscillation such as that indicated as at "C" in FIG. 9.

The items handler 210 utilizes a shaft 245 intermediate the shaft 278 corresponding to the shaft 78 and the shaft 222 corresponding to the shaft 22. A chain 247 drivingly connects the shaft 278 to the shaft 245 and the shaft 245 includes a gear 251 thereon meshed with a similar gear 253 on the shaft 222, to reverse rotation of shafts 220 and 222 as required to drive the rails in the forward direction through the arms 227 an endless chain 288 corresponding to the chain 88 being utilized to drivingly connect the shaft 222 to the shaft 220. Otherwise, the items handler 210 is substantially identical to the items handler 10 and it may be understood that the items handler 210 may also include one pair of stationary rails 232 and only one pair of oscillating rails 232.

The items handler may efficiently handle loaves of sliced bread in a manner which is believed to be obvious from the above foregoing and it is believed apparent that the items handler may also be utilized in conjunction with many other items such as can and bottle tops, cigarette packs, cards and other similar items. Because of the adjustment feature of that form of the invention illustrated in FIGS. 6 through 9, the items handler 10 may be readily adjusted to various sized items. Also, the cam 90 may be changed in order to vary the throw of the structure 42 and it will be noted from FIGS. 1 and 4 that the panels 114 and 116 comprise arms spaced axially along the shafts 104 and 106.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An items handler for successively handling a horizontal row of items, said handler including means defining a movement direction change station and first receiving means for receiving a horizontal row of items thereon and lengthwise advancing the row of items along a predetermined path toward said station, items engaging means at said station for successively engaging and laterally shifting the endmost item in said row advanced toward said station, said first receiving means including structure for intermittently advancing said row of items along said predetermined path, said station including abutment structure facing in the opposite direction along said path, against which the leading item in said row may be abutted and supported for back and forth oscillation relative to said receiving means, means driving said abutment structure in timed relation with operation of said receiving means whereby said abutment structure will be advanced by abutting engagement by the endmost item in said row being advanced along said path as each incremental advance of said row of items is terminated and said abutment structure will be subsequently retracted prior to the beginning of the next incremental advance of said items along said path, said items engaging means including structure operative to engage and laterally shift the endmost item intermediate initial retraction of said abutment structure and the initiation of the next incremental advance of said items by said first receiving means.

2. The combination of claim 1 wherein said handler also includes second receiving means for successively receiving and stationarily supporting items laterally shifted by said items engaging means.

3. The combination of claim 2 wherein said handler further includes discharge means for successively discharging items received by said second receiver means.

4. The combination of claim 3 wherein said discharge means includes means for downwardly discharging, by gravity, items from said second receiver means.

5. The combination of claim 1 wherein said items engaging means includes means for engaging the endmost item from below and upwardly laterally shifting the endmost item.

6. The combination of claim 1 wherein said abutment structure includes means for engaging and supporting the endmost item advanced thereagainst from below.

7. The combination of claim 6 wherein said items engaging means includes means for engaging the endmost item from below and upwardly laterally shifting the endmost item.

8. The combination of claim 7 wherein said means for supporting the endmost item from below is supported relative to said abutment structure for shifting between horizontally retracted and extended positions, said items engaging means including means operative to horizontally retract said abutment structure supported engaging means as said items engaging means moves into final position for engagement with the endmost item to be upwardly laterally shifted.

9. The combination of claim 1 wherein said first receiving means includes structure for adjusting the effective length of incremental advance of said items by said first receiving means.

10. The combination of claim 9 wherein said items engaging means includes means for engaging the endmost item from below and upwardly laterally shifting the endmost item.

11. The combination of claim 9 wherein said abutment structure includes means for engaging and supporting the endmost item advanced thereagainst from below.

12. A conveyor for intermittently advancing a row of items in one direction along a predetermined path, an abutment supported in items blocking position along said path, facing in the opposite direction and shiftable for and back along said path, drive means driving said conveyor in timed relation to advance said abutment in said opposite direction in slightly delayed time relation to operation of said conveyor to advance said items in said one direction, and items engaging and lateral shifting means driven by said drive means in timed sequence with said conveyor and abutment to engage and laterally displace the item adjacent said abutment from said path subsequent to initial shifting of said abutment in said one direction along said path.

13. In a walking beam conveyor, a pair of upstanding generally parallel arms, the lower ends of said arms being journaled on eccentrics rotated about generally horizontal axes transverse to said arms, a conveyor beam, the opposite end portions of said conveyor beam being pivotally supported from the upper ends of said arms for relative angular displacement of said arms relative to said beam about axes transversed to said arms and beam, each of said arms including an elongated longitudinally extending guide structure and a pair of pivot structures supported for vertical adjustment in unison, relative to said axes and slidably engaged in said guide structure.

* * * * *